Oct. 3, 1961 J. J. A. P. VAN AMSTEL 3,002,864

METHOD OF MANUFACTURING SEMI-CONDUCTOR DEVICES

Filed Aug. 10, 1959

INVENTOR
Johannes Jacobus Asuerus Ploos van Amstel
BY
Frank R. Jerifari
AGENT 3,002,864
Patented Oct. 3, 1961

3,002,864

METHOD OF MANUFACTURING SEMI-CONDUCTOR DEVICES

Johannes Jacobus Asuerus Ploos van Amstel, Eindhoven, Netherlands, assignor to North American Philips Company, Inc., New York, N.Y., a corporation of Delaware
Filed Aug. 10, 1959, Ser. No. 832,852
Claims priority, application Netherlands Sept. 5, 1958
2 Claims. (Cl. 148—1.5)

This invention relates to a method of manufacturing a semi-conductor device, in which method on a germanium semi-conductor body at least one electrode or contact is provided by applying a suitable metal or alloy to this body and alloying this material in the molten condition to part of the germanium of the body.

In this method, when the device is cooled, a layer of germanium segregates containing at least one of the elements of the material in solid solution, which layer grows on the crystal lattice of the initial germanium body. By means of this method p–n barrier layers are obtained by a suitable choice of the material to be applied.

This known method had a limitation in that the material did not sufficiently wet the body.

It is an object of the present invention to obviate this disadvantage.

According to the invention, in the above-mentioned method use is made of a flux which is capable of forming the halide of at least one of the alloying elements, and the semi-conductor body is heated to a temperature of at least 150° C. in an oxidising atmosphere prior to the application of the material. The term "alloying elements" is to be understood to mean the element or elements of which the applied material consists, and the germanium itself.

Figure 1:
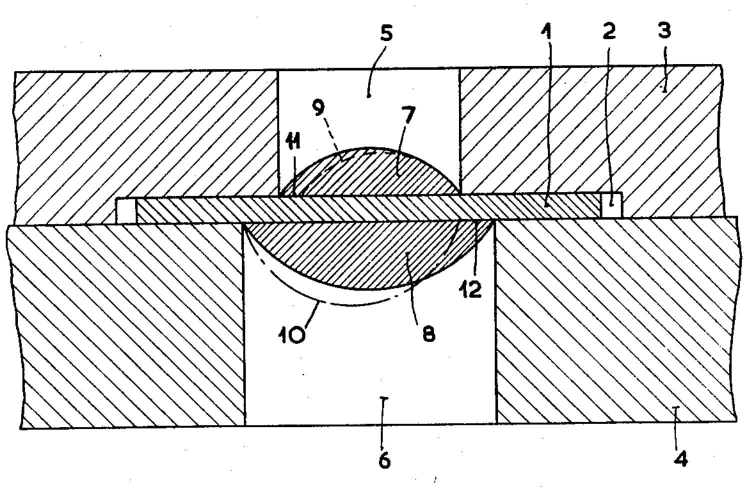
Figure 2:
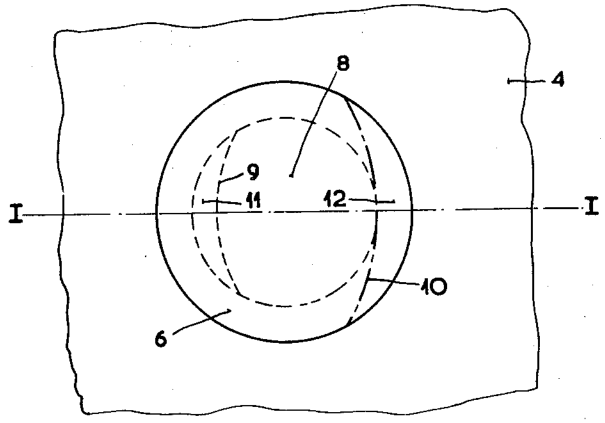

In order that the invention may readily be carried out, an embodiment thereof will now be described, by way of example, with reference to the accompanying diagrammatic drawings, in which FIG. 1 is a sectional view of a die in which two electrodes can be alloyed to a germanium disc, and FIG. 2 is a bottom plan view of this die.

A germanium wafer 1 of the n-conductivity type and of thickness 150 microns is heated in air to 200° C. for 10 minutes.

After cooling, the wafer is arranged in an open space 2 between the upper part 3 and the lower part 4 of the die. The upper part has a circular aperture 5 of diameter 0.7 mm., and the lower part 4 an aperture 6 of diameter 1.0 mm.

A pellet of indium having a weight of 0.8 mg. is arranged on the wafer in the aperture 5 and heated to a temperature of 300° C. in a dry hydrogen stream to which a small amount of hydrochloric acid vapour is added for a few seconds. The molten indium spreads over the germanium surface to the edges of the aperture 5, the hydrochloric acid vapour promoting the wetting. Thus an electrode 7 is produced.

After the die has been turned over, a second indium pellet having a weight of 1.8 mg. is similarly arranged on the other side of the wafer in the aperture 6 and fused to the wafer, so that an electrode 8 is produced. At the same time, a base contact (not shown) is soldered to the wafer with tin solder.

Then the temperature is increased to 600° C. so that the indium is alloyed to the germanium. After cooling segregated layers of p-type germanium are produced under the indium.

It has been found that the duration of the preheating of the germanium wafer in air is not very critical, apart from the above-mentioned lower temperature limit, and that heating to 500° C. for 20 minutes provides an equally satisfactory result. At temperatures above 500° C. there is a risk that locally an excessively deep oxidation occurs, which again counteracts a satisfactory adherence. Such oxidation is indicated by a colour change of the surface. Hence, preferably the heating is stopped before a colour change of this surface occurs.

Preferably, however, heating is effected at a temperature above 200° C., since otherwise an excessively long heating period is required to achieve the aim in view.

As an explanation of the result of this method it should be noted that, if the preheating treatment in an oxidising atmosphere is entirely omitted and otherwise the method as described in the example is followed, the electrode or contact material does not always spread to the edges of the apertures 5 and 6, respectively. In this event, the electrodes may take the shapes indicated by broken lines 9 and 10, sickle-shaped parts 11 and 12 (FIG. 2) remaining uncovered. The emitter and collector are no longer arranged coaxially and this naturally detracts from the electrical properties.

In the example, the use of hydrochloric acid vapour as a flux in alloying indium to germanium was described. Obviously, the method according to the invention is not restricted to this embodiment but it can also be applied when using other applied metals or alloys, such as indium, bismuth, lead and tin with or without donors and/or acceptors.

Furthermore, instead of hydrochloric acid as a flux use can be also made of other substances which form a halide of at least one of the alloying elements, such as halogenic acids, halogen hydrogen molecule complexes of organic compounds, for example pyridine hydrochloride, or various inorganic halides, for example indium chloride. United States Patent No. 2,887,416, issued May 19, 1959, discloses other example of suitable fluxes which form the halides of the electrode-forming alloying material.

What is claimed is:

1. In the method of alloying a contact to a germanium semiconductive body wherein the contact material is placed in contact with the semiconductive body in the presence of a flux capable of forming the halide of an element of one of the contact materials and the body and is heated at a temperature at which the contact material melts and alloys to the body forming a recrystallized region whose conductivity is determined by the contact material, the improvement comprising first heating the semiconductive body before the contact material is contacted thereto in air to a temperature between 200° C. and 500° C. to oxidize the surface thereof, and thereafter contacting the oxidized surface with the contact material and carrying out the alloying process as above defined.

2. In the method of alloying a contact to a germanium semiconductive body wherein the contact material is placed in contact with the semiconductive body in the presence of a flux capable of forming the halide of an element of one of the contact materials and the body and is heated at a temperature at which the contact material melts and alloys to the body forming a recrystallized region whose conductivity is determined by the contact material, the improvement comprising first heating the semiconductive body before the contact material is contacted thereto in an oxidizing atmosphere to a temperature of at least 150° C. to oxidize the surface thereof but terminating the heating before the surface of the body undergoes a change in color, and thereafter contacting the oxidized surface with contact material and carrying out the alloying process as above defined.

References Cited in the file of this patent

UNITED STATES PATENTS

| | | |
|---|---|---|
| 2,419,237 | Treuting | Apr. 22, 1947 |
| 2,761,800 | Ditrick | Sept. 4, 1956 |
| 2,802,760 | Derick | Aug. 13, 1957 |
| 2,823,149 | Robinson | Feb. 11, 1958 |
| 2,874,083 | Stripp | Feb. 17, 1959 |